US005944385A

United States Patent [19]

Pearce

[11] Patent Number: 5,944,385

[45] Date of Patent: Aug. 31, 1999

[54] ADJUSTABLE WHEELCHAIR BACK SEAT BACK ANGLE ADJUSTMENT MECHANISM AND RELATED DEVICES

[75] Inventor: Tony M. Pearce, Alpine, Utah

[73] Assignee: Teksource, LC, Draper, Utah

[21] Appl. No.: 08/962,943

[22] Filed: Nov. 8, 1997

Related U.S. Application Data

[60] Provisional application No. 60/029,702, Nov. 12, 1996.

[51] Int. Cl.$^{6}$ ........ B60N 2/02

[52] U.S. Cl. ........ 297/354.12; 297/284.9; 297/440.2; 297/452.4

[58] Field of Search ........ 297/440.2, 440.1, 297/284.9, 452.36, 354.12, 452.4, DIG. 4

[56] References Cited

U.S. PATENT DOCUMENTS

| | | | |
|---|---|---|---|
| 2,534,009 | 12/1950 | Freasier et al. | 297/452.4 X |
| 5,102,195 | 4/1992 | Axelson et al. | 297/440.2 X |
| 5,127,709 | 7/1992 | Rubinstein et al. | 297/440.2 |
| 5,551,756 | 9/1996 | Gurasich et al. | 297/354.12 X |
| 5,556,168 | 9/1996 | Dinsmoor, III et al. | 297/440.2 |
| 5,593,211 | 1/1997 | Jay et al. | 297/440.2 X |

FOREIGN PATENT DOCUMENTS

| | | | |
|---|---|---|---|
| 76930 | 5/1950 | Norway | 297/354.12 |

*Primary Examiner*—Milton Nelson, Jr.
*Attorney, Agent, or Firm*—Daniel McCarthy; Brick Power

[57] ABSTRACT

A wheelchair seat back having width adjustable wings, a mechanism to permit forward and backward angular adjustment of the wheelchair seat back, a clamping assembly for mounting the wheelchair seat back to wheelchair uprights, and a width adjustable cushion for a width adjustable wheelchair seat back.

11 Claims, 11 Drawing Sheets

ADJUSTABLE WHEELCHAIR BACK SEAT BACK ANGLE ADJUSTMENT MECHANISM AND RELATED DEVICES

This patent application claims the benefit of U.S. Provisional Application Ser. No. 60/029,702, filed on Nov. 12, 1996, and priority is claimed thereto for all of the material disclosed either explicitly or inherently therein.

BACKGROUND OF THE INVENTION

A. Field of the Invention

This invention relates to the field of wheelchair backs and covers and adjustment mechanisms and cushions for the same. More particularly, the inventors have invented a wheelchair back with width adjustable wings, a wheelchair back with forward and backward angular adjustment, a latch mechanism useful for attaching a wheelchair back to a wheelchair and useful in other environments as well, and a width adjustable wheelchair back cover and padding assembly. Additionally, various of the invented structures have useful application in products other than wheelchairs and the inventors have recognized this and intend to secure protection in fields other than wheelchairs.

B. The Background Art

In the background art, there had been some work done in the area of adjustable and foldable disassemblable wheelchairs. The reader is directed to the following U.S. Pat. Nos. for representative examples: Re. 32,242 issued in the name of Jeffrey P. Minnebraker; No. 5,253,888 issued in the name of Paul Frederich; No. 5,152,543 issued in the names of Larry A. Sims, Robert W. Reynolds, Raymond P. Lewandowski, and Robert T. McWethy; No. 4,989,890 issued in the names of Walter G. Lockard, Herbert J. Hockstra, Allen J. Boris and Douglas M. Nickles; No. 4,500,102 issued in the names of Gilbert E. Haury, Nathalal G. Patel, Walter G. Lockard and Thomas R. Wiatrak; No. 4,489,955 issued in the name of W. Duane Hamilton; No. 4,431,076 issued in the name of Robert C. Simpson; No. 3,618,068 issued in the name of Edward M. Greer; and No. 2,824,597 issued in the name of Monroe Arnold Lerman, each of which is hereby incorporated by reference. The '242 patent discloses a wheelchair that accommodates patients of different sizes. The '888 patent discloses a wheelchair designed for quick disassembly which provides some adjustment. The '543 patent discloses a composite frame wheelchair that offers some adjustment to the user. The '890 patent discloses a wheelchair that provides both length and width adjustment. The '102 patent discloses a wheelchair that has various adjustment features. The '955 patent discloses a wheelchair with an adjustable center of gravity. The '076 patent discloses a wheelchair that has adjustable arm resets and a self-standing feature. The '068 patent discloses a wheelchair that has an angular adjustable backrest. The '597 patent discloses a width adjustable wheelchair.

Tilting and angle adjustable seat backs are disclosed in the following U.S. Pat. No. 2,491,154, issued in the name of Lawrence E. Blazey; No. 2,565,867, issued in the name of Carl Ernst Edvard Lundquist; No. 3,618,968, issued in the name of Edward M. Greer; No. 3,964,786, issued in the name of David Mashuda; No. 4,500,102, issued in the names of Gilbert E. Haury, Nathalal G. Patel, Walter G. Lockard and Thomas R. Wiatrak; No. 4,592,570, issued in the name of Joe-Massoud Nassiri; No. 4,593,929, issued in the name of Ronald H. Williams; No. 5,035,467, issued in the names of Peter Axelson, Michael Heinrich, Ann Lasko-Harvill and Michael W. Silverman; No. 5,062,677, issued in the names of Eric C. Jay and Michael H. Nordquist; No. 5,127,709, issued in the names of Stanley Rubinstein and Terry D. Robuck; No. 5,211,446, issued in the names of Eric C. Jay and Michael H. Nordquist; No. 5,364,162, issued in the names of Christopher Bar and Calvin L. Guthrie; and No. 5,556,168, issued in the names of John C. Dinsmoor, III, Barry Van Everen, Michael W. Johnson and Grant C. Denton.

The '154 patent discloses a seat back for a stenographer's chair which tilts freely to adjust to the user's back. The '867 patent discloses a mechanism for locking the back of a chair into different angular positions relative to the chair seat. The mechanism of the '867 patent includes an elongate guide or slot connected to the seat back, which is clamped between supporting arms with a bolt and a wing nut. The supporting arms, which are connected to the chair seat, each have a non-circular curved slot formed therethrough. The elongate guide or slot provides height adjustability, while the curved slots in the supporting arms impart angular adjustability to the seat back.

The '968 patent discloses a wheelchair having a seat back with angle adjustability. The angle adjustment mechanism of the '968 patent includes upright tubular members which are pivotally connected to the wheelchair frame and a hydraulic actuator. One end of the hydraulic actuator is pivotally connected to the upright tubular member. The other end of the hydraulic actuator is pivotally connected to the wheelchair frame.

The wheelchair seat back of the '786 patent is pivotally mounted to the seat bottom by pins or rivets. Angular motion of the seat back around the mount is governed by a hydraulic actuator. The stationary end of the hydraulic actuator is pivotally connected to the frame of the seat bottom. The piston end of the hydraulic actuator is pivotally connected to a curved bracket that is fixedly attached to the seat back.

In the seat back angular adjustment mechanism of the '102 patent, a hinge connects the lower portion of the seat back to the wheelchair frame. A first attachment mechanism pivotally connects the seat back to the hinge. A second attachment mechanism includes an arcuate slot through which a fastener passes to secure the seat back to the hinge in the desired angular position.

Similarly, the '570 includes a mechanism for adjusting the angle of the seat back relative to the wheelchair frame. That mechanism includes an L-shaped bracket, the horizontal arm of which is fixedly attached to a horizontal member of the wheelchair. The bottom of the seat back pivotally attaches at the corner of the L-shaped bracket with a first fastener. The vertical arm of the bracket includes an arcuate slot, through which a second fastener passes, and which facilitates angular adjustment of the seat back.

The angle adjustment mechanism disclosed in the '929 patent includes a planetary gear arrangement operably interconnected with a knob, such as that used to adjust the seat backs of some automobiles. The adjustment mechanism is located at the base of the seat back frame, and connects the seat back to the side frame.

The '467 patent discloses a seating system wherein the seat back is pivotally attached to the seat bottom. The angle of the seat back disclosed in the '677 patent changes depending upon the position of the seat back along arcuate uprights.

The '709 patent discloses a quick release attachment bracket for a wheelchair seat back. Two J-shaped members that are attached to each side of the seat back engage each of the wheelchair uprights. The quick release brackets are fixedly mounted to the uprights such that they are aligned with the J-shaped members. The quick release brackets force the J-shaped members against the uprights, forcing the J-shaped members against the uprights. The horizontal position of each bracket may be adjusted relative to the seat back to provide angular adjustment of the seat back relative to the upright.

The '446 patent discloses angular adjustment of a seat back which is governed by the placement of the seat back along arcuate uprights. The '162 patent discloses a backrest assembly for a wheelchair wherein two U-shaped outriggers are pivotally attached to both of a wheelchair's uprights. The outriggers are positioned across the wheelchair near the upper and lower portions of the seat back such that the back rests upon the transverse portion of the outriggers. Clamps on the seat back engage the outriggers in several positions. The angle of the seat back relative to the uprights is adjusted by rotation of the outriggers within the clamp.

In the '168 patent, a wheelchair seat back is disclosed that is fastened to spaced apart support posts by use of hook and mounting units. The hook and mounting units of the '168 patent are located at upper and lower positions on each side of the seat back. The hooks engage a wheelchair upright. Slots formed through the hooks permit adjustment of the positions of both the upper and lower hooks relative to the seat back, facilitating angular adjustment of the seat back relative to the wheelchair. However, the angular adjustment mechanism of the '168 patent does not allow for pivotal adjustment of the seat back, and thus requires some movement of at least one of the upper or lower brackets relative to the upright.

In a PCT patent application which was assigned International Publication Number WO 92/14387 in the name of inventors Eric C. Jay, John A. Dyer and John C. Dinsmoor, which is hereby incorporated by reference, a wheelchair back which is adjustably affixed to a rod is disclosed.

U.S. Pat. No. 1,734,179, issued in the name of P. W. Olson, No. 3,379,450 issued in the name of E. Jones et al., No. 3,704,910 issued in the name of Walter F. Wilcott, No. 4,375,295 issued in the name of Frank Volin, No. 4,565,385 issued in the name of Marvin A. Morford, and No. 4,746,168 issued in the name of Roberto Bacesco, each of which is hereby incorporated by reference, disclose various wheelchair and seating-related apparatus, including adjustability thereof.

In a catalog entitled "OTTO BOCK Orthopedic Industry Wheelchair Seating Accessories and Hardware Catalogue 1992", which is hereby incorporated by reference, various back cushions, backshells and attachment mechanisms for them are disclosed, as well as other wheelchair-related products.

For more general background related to wheelchair back and seat mechanisms, the reader is directed to U.S. Pat. No. 5,108,202 issued in the name of Kenneth B. Smith, No. 4,884,841 issued in the name of Robert E. Holley and No. 4,054,319 issued in the name of Robert K. Fogg, Jr. and Christopher P. Staehli, each of which is hereby incorporated by reference. The '202 patent discloses a structure for raising a patient seated in the wheelchair to a standing position. The '841 patent discloses a mechanism for assisting patient into and from a seated position. The '319 patent discloses a wheelchair that can accommodate a patient in a seated position, in a standing position, or in a variety of positions between sitting and standing.

For information related to adjustability devices and supports, including those related to wheelchairs and wheelchair seating, the reader is directed to the following U.S. Pat. No. 3,790,115 issued in the name of Abraham J. Schulman; No. 4,076,195 issued in the name of Douglas Lester Uhler; No. 4,687,165 issued in the name of Robert S. Blackburn; No. 5,149,173 issued in the name of Eric C. Jay; No. 5,352,023 issued in the names of Eric C. Jay and John C. Dinsmoor, III; and No. 5,364,162 issued in the names of Christopher Bar and Calvin Guthrie, each of which is hereby incorporated by reference. The '115 patent discloses an expandable support with a telescoping feature. The '195 patent discloses an adjustable mounting assembly. The '165 patent discloses an adapter plate assembly for adjustable mounting of objects. The '173 patent discloses wheelchair seat backs. The '023 patent discloses wheelchair seat and back assemblies.

For information related to frame structures from which wheelchair components might be made, the reader is directed to U.S. Pat. No. 5,464,240 issued in the names of Alexander J. Robinson and Christopher O. Paragas, No. 5,011,172 issued in the names of August T. Bellanca and August T. Bellanca, Jr., No. 4,550,727 issued in the name of Peter Resele, No. 4,548,422 issued in the names of Diaz Michel and Loeillet Christian, and No. 3,533,643 issued in the name of Ryoichi Yamada, each of which is hereby incorporated by reference. The reader is also directed to Italian patent no. 448,310 (Jul. 11, 1949), French patent no. 895,046 (Jan. 12, 1945) and Great Britain patent no. 19,193 (Nov. 16, 1895), each of which is hereby incorporated by reference. The '240 patent discloses a two piece hollow shell frame made from fiber-reinforced plastic which uses tangs and devises and protrusions and receptacles for added strength. The '172 patent discloses various lightweight frame structures. The '927 patent discloses a two-part shell frame for two-wheeled vehicles. The '422 patent discloses a bicycle frame made from two joined shell halves. The '643 patent discloses a bicycle frame assembly. The Italian patent discloses cross sections of various frames or tubing. The French patent discloses a bicycle frame including its cross-sectional view. The British patent discloses three different cross sections of a bicycle frame.

Applicants are aware of various pieces of art in the area of cushioning. For general information regarding cushioning devices in the background art, the reader is directed to Great Britain Patent No. 1,261,475 (Jan. 2, 1972) and the following U.S. Pat. No. 1,228,783, issued in the name of G. E. Kerivan; No. 2,491,557 issued in the name of G. L. Goolsbee; No. 2,655,369 issued in the name of L. C. Musilli; No. 2,672,183 issued in the name of A. E. Forsyth; No. 2,814,053 issued in the name of J. G. Sevcik; No. 3,459,179 issued in the name of I. Olesen; No. 3,605,145 issued in the name of R. H. Graebe; No. 3,801,420 issued in the name of Ann Anderson; No. 3,893,198 issued in the name of E. Allan Blair; No. 3,968,530 issued in the name of Reginald Dyson; No. 4,163,297 issued in the name of Otto W. Neumark; No. 4,247,963 issued in the name of Lakshmi Reddi; No. 4,274,169 issued in the name of Natalie C. Sandiford; No. 4,483,029 issued in the name of Patrick R. D. Paul; No. 4,485,505 issued in the name of Patrick R. D. Paul; No. 4,498,205 issued in the name of Kazuhiko Hino; No. 4,572,174 issued in the names of Kaeriel Elleader and Mille Stand; No. 4,588,229 issued in the name of Eric C. Jay; No. 4,628,557 issued in the name of Michael E. Murphy; No. 4,660,238 issued in the name of Eric C. Jay; No. 4,698,864 issued in the name of Robert H. Graebe; No. 4,713,854 issued in the name of Robert H. Graebe; No. 4,726,624 issued in the name of Eric C. Jay; No. 4,728,551 issued in the name of Eric C. Jay; No. 4,737,998 issued in the name of Arthur K. Johnson, Sr.; No. 4,842,330 issued in the name of Eric C. Jay; No. 5,018,790 issued in the name of Eric C. Jay; No. 5,052,068 issued in the name of Robert H. Graebe; No. 5,111,544 issued in the name of Robert H. Graebe; No. 5,152,023 issued in the name of Robert H. Graebe; No. 5,163,196 issued in the names of Robert H. Graebe and Winfield R. Matsler; No. 5,201,780 issued in the names of John C. Dinsmoor, III, Grant C. Seaon, Eric C. Jay and Richard R. Runkles; No. 5,282,286 issued in the name of Michael MacLeish; No. 5,360,653 issued in the name of Robert E. Ackley; No. 5,369,828 issued in the name of Robert H. Graebe; No. 5,421,874 issued in the name of Tony M. Pearce; and No. 5,429,852 issued in the name of Raymond Quinn, each of which is hereby incorporated by reference. The British patent discloses a mattress with air or water inflatable members. The '783 patent discloses a pneumatic mattress. The '557 patent discloses a mattress having multiple air cells. The '369 patent discloses a shock absorbing device that includes adjacent, cooperating deformable chambers containing a fluid medium. The '183 patent discloses a seat cushion that has a plurality of inflatable cylindrical elements. The '053 patent discloses an inflatable mattress. The '179 patent discloses a supporting pad filled with expanded polystyrene beads. The '145 patent discloses a body support having numerous pliant, outwardly extending air cells. The '420 patent discloses a quilted bedspread. The '198 patent discloses a foam mattress. The '530 patent discloses a pad containing a mixture of a viscous gel fluid and silica and re-expanded polystyrene beads. The '297 patent discloses a mattress that has multiple pillows partially filled with polystyrene beads. The '963 patent discloses a two-sheet liquid support device. The '169 patent discloses a stitched bed covering. The '029 patent discloses a fluidized supporting apparatus containing granular material. The '505 patent discloses an inflatable mattress with resilient support cells. The '205 patent discloses a medical bed containing fluidized particle media. The '174 patent discloses a low friction bed pad. The '229 patent discloses a seat cushion with a fluid filling material. The '557 patent discloses a mattress with removable inserts. The '238 patent discloses a hemorrhoid seat cushion partially filled with a fluid. The '864 patent discloses a cellular cushion having flexible hollow cells. The '854 patent discloses a cushion formed from strips of resilient foam. The '624 patent discloses a seat cushion containing a fluid filling material. The '551 patent discloses flowable pressure compensating fitting materials. The '998 patent discloses a waterbed mattress with free-standing cells arranged in a honeycomb pattern. The '330 patent discloses a seat cushion that has a foam base and a fluid portion. The '790 patent discloses a seat cushion which can be customized by the user. The '068 patent discloses a seat cushion with inflatable, upwardly projecting cells. The '544 patent discloses cover for a cushion. The '023 patent discloses a cushion having flexible cells formed from an elastomeric material and containing a gas. The '196 patent discloses an inflatable cushion with zoned cells. The '780 patent discloses a multi-layer mattress pad which includes a fluid bladder. The '286 patent discloses a cushion which has fluid floatation characteristics. The '653 patent discloses a foam pad. The '828 patent discloses a cushion having pyramidal air cells. The '874 patent discloses a cushioning material that includes lightly lubricated microspheres. The '852 patent discloses a chair pad that includes foam among its various layers.

Each of the above references is hereby incorporated by reference in its entirety.

What is needed is a width-adjustable rigid seat back for a wheelchair. In addition, a light weight seat back is desired. A mechanism is needed which provides improved angular adjustment of a wheelchair seat back or other device in the fore and aft directions. Adjustability to several discrete angular positions is also needed. A seat back attachment mechanism is needed which is easy to use and which facilitates the ready removability of a seat back from, and ready and secure replacement of a seat back upon a wheelchair. Further, a cushion and cover for a width-adjustable seat back is needed.

SUMMARY OF THE INVENTION

The seat back of the present invention meets the foregoing needs. The seat back is rigid, light weight, and width-adjustable. The angle of the seat back in relation to the wheelchair frame is also adjustable in both the fore and aft directions. The present invention includes an easy-to-use attachment mechanism which facilitates the ready removal of a seat back from and ready reattachment and securing of a seat back to a wheelchair. A width adjustable cover and cushion according to the invention may also be used with the seat back of the invention.

It is an object of the invention to provide a wheelchair seat back that accommodates width adjustment for the comfort and convenience of patients of differing sizes. It is a feature of the invention that a wheelchair seat back center piece or spine is provided that has a number of ribs or one or more panels extending to its left and right, and that a left wing and a right wing are provided which are attachable to the left and right ribs or panels in a number of different positions in order to provide numerous wheelchair seat back width adjustment settings, including offset or non-centered wheelchair seat back orientations, depending upon the needs of the patient. It is a further feature of the invention that a back wedge attachable to the wheelchair seat back spine has two slots in it to accommodate sliding width adjustment to facilitate attachment of the wheelchair seat back to vertical uprights on wheelchairs of various widths. It is a consequent advantage of the invention that the wheelchair seat back can be custom fit to various patients in order to accommodate their comfort and support needs.

It is an object of the invention to provide a wheelchair seat back assembly that has positive and negative angular adjustment from a vertical, upright position. It is a feature of the invention that the wheelchair seat back includes a lower point of rotation, such as two outwardly extending rods, and an upper arc of adjustment, such as the two back hooks each having two rows of angle adjustment holes arranged as an arc of a circle whose radius is equal to the distance from the row of holes to the lower point of rotation. It is a consequent advantage of the invention that the wheelchair seat back can be adjusted to have a variety of forward or backward tilts in a mechanism that is simple to manufacture, assemble and adjust.

It is an object of the invention to provide an attachment bracket assembly which readily and securely attaches a second object, such as a wheelchair seat back, to an elongate frame member of a first object, such as a wheelchair push handle, and secures the first object from perpendicular, lateral movement in relation to the frame member while allowing longitudinal movement along the frame member. The latching bracket of the present invention includes an attachment portion, a bracket member, a latch attached to the bracket member and a latch-securing mechanism which engages the latching mechanism. The attachment portion is attached to the second apparatus. A frame securing portion of the bracket member is adapted to engage the elongate frame member. The latching bracket member includes a frame securing portion which is formed to fit partially around the frame member. The latch, which is readily moveable between open and closed positions, bridges the opening of the bracket member when placed in the closed position, holding the frame member within the frame securing portion of the bracket member and preventing movement of the second apparatus in a direction substantially perpendicular to the elongate frame member of the first apparatus.

Consequently, the features of the latching bracket facilitate the rapid connection or disconnection of a second apparatus from a first apparatus and the secure fastening of a second apparatus to a first apparatus.

Another object of the invention is to provide an adjustable cushion for placement on the seat back. The adjustable cushion has a central cushion and wing cushions on each side of the central cushion. The wing cushions are attached to the central cushions by extension mechanisms. The extension mechanisms facilitate movement of the wing cushions from side to side relative to the central cushion, making the cushion adjustable according to the width and wing position of the width-adjustable seat back of the invention.

Further objects, features and advantages of the invention will become apparent to persons of ordinary skill in the art upon reading the specification and appended drawings.

DETAILED DESCRIPTION OF THE INVENTION

A. Width-Adjustable Seat Back

Figure 1B:
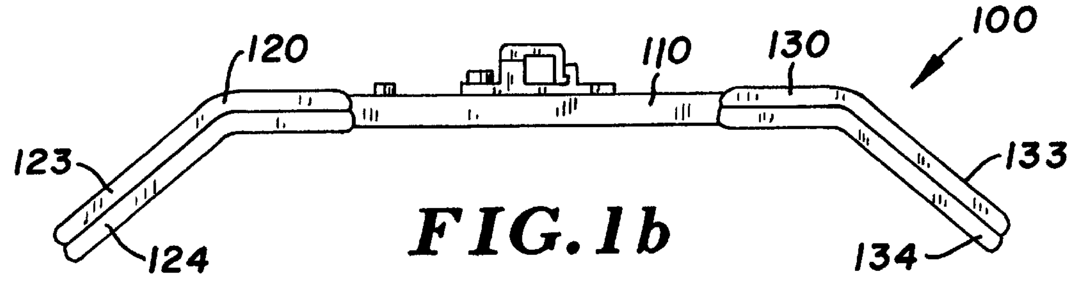
FIG. 1*b* depicts a top view of the wheelchair seat back of FIG. 1*a;*
Figure 1A:
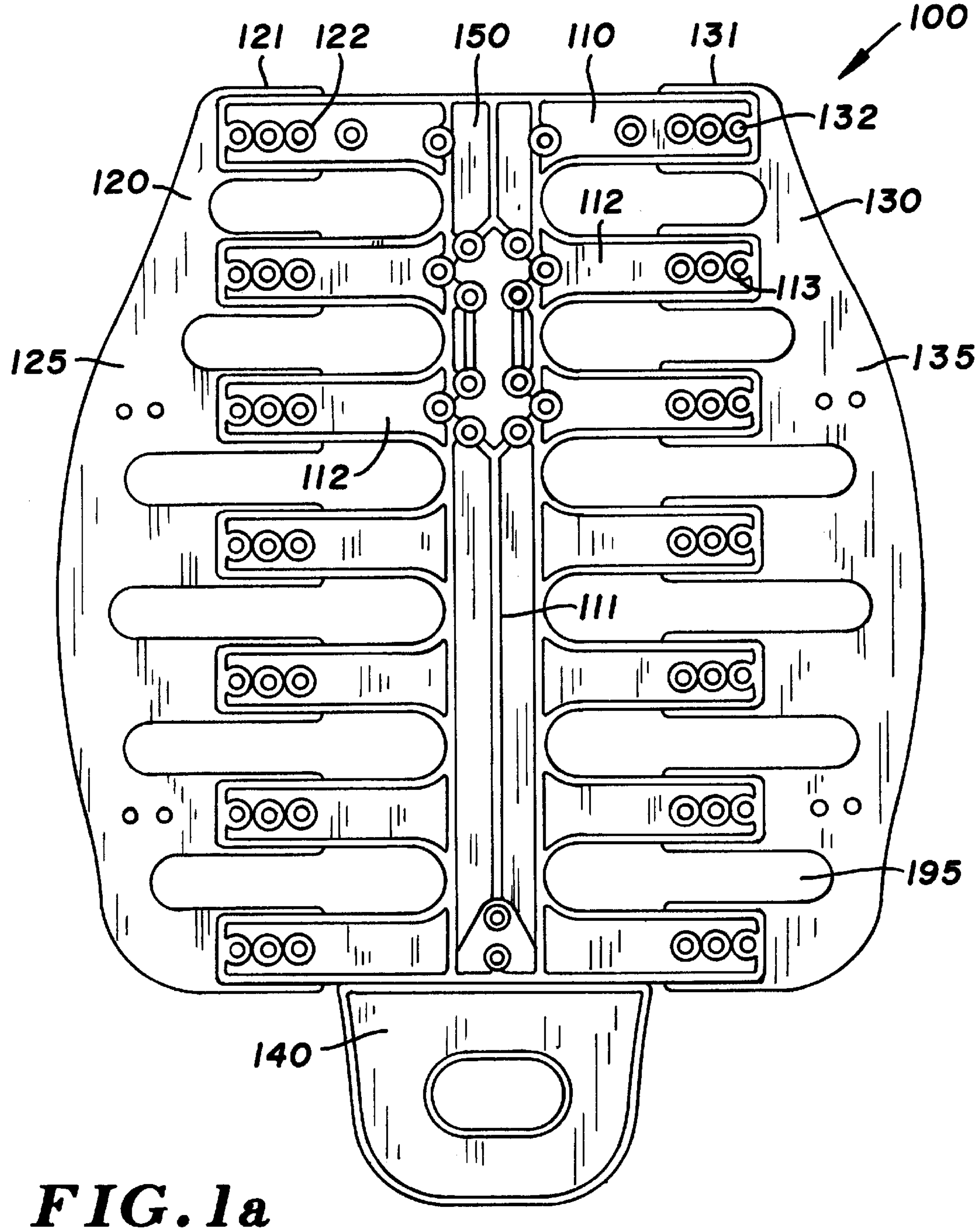
FIG. 1*a* depicts a front view of an assembled wheelchair seat back of the invention.

FIGS. 1*a* and 1*b* respectively depict front and top views of a preferred wheelchair seat back 100 of the invention. The wheelchair seat back 100 includes a seat back center section or spine 110, a left wing 120, and a right wing 130. Optionally, a tail section 140 may be included. A headrest may be mounted in the vicinity of 150 as desired. The spine 110 includes a center member 111 which is generally vertically oriented in the assembled wheelchair, and a plurality of leftwardly and rightwardly generally horizontal ribs 112 extending or protruding from the left and right sides of the center member. Alternatively, the ribs collectively or individually could be replaced by one or more plates extending in a similar way as the ribs.

The preferred spine 110 is made in one piece from injection molded fiber reinforced plastic material, as described in detail below, although other materials including without limitation wood, plastic, fiberglass, rubber, metals such as brass copper, stainless steel, bronze, titanium, etc., and others may also be used. Other configurations of the spine are also within the scope of the invention, such as composite half shells, similar to those disclosed in U.S. Pat. No. 5,464,240 (which is hereby incorporated by reference), which are preferably injection molded and later joined to form an assembled spine, and others which maintain the functionality of the spine.

The spine 110 as depicted has a plurality of mounting holes or bosses 113 on its ribs 112 which facilitate positioning upon and mounting of the left wing 120 and right wing

130 to the ribs 112. It can be seen from FIG. 1*a* that multiple mounting holes or bosses 113 are provided on the ribs 112 so that the wings can be mounted thereto at a variety of generally lateral locations to provide a seat back width adjustment mechanism.

Likewise, the wings 120 and 130 each have a plurality of ribs 121 and 131 extending from their outer periphery 125 and 135, respectively. Each rib has a plurality of mounting holes or bosses 122 and 132 to accommodate width adjustment of the wings with respect to the spine. In the preferred embodiment of the seat back of the invention, the wings 120 and 130 have receptacles in their ribs in order to receive the ribs of the spine 110—the ribs of the spine slide along the ribs of the wings, and the ribs of the wings slide along the ribs of the spine.

As those in the art will readily appreciate, receptacles in the spine ribs which receive the ribs of the wings, as well as other alternative configurations which maintain the functionality of the width-adjustable seat back are also within the scope of the invention. As the preferred wheelchair seat back 100 is assembled (i.e., the wings 120 and 130 are installed on the spine 110), a plurality of ventilation passages 195 are formed between the ribs on each side of the spine. Ventilation passages 195 permit ventilation to the patient's back if an air-permeable cushion is used on the seat back. The ventilation passages also remove material, which lightens the seat back. Ventilation and weight reduction are the reasons that ribs are preferred over continuous plates.

A second adjustment mechanism useful in the seat back of the present invention includes slots formed through the wing ribs and/or the spine ribs which permit sliding movement of the wings in relation to the spine to an infinite number of positions. Preferably, such sliding movement of the wings in relation to the center section is in an at least partially lateral direction relative to the center section. A third adjustment mechanism useful in the seat back involves holes, bosses or slots located on the top and/or bottom edges of the ribs of the wings and of the spine for mounting the wings to the spine in a variety of locations. As those of ordinary skill in the art will readily appreciate that other mechanisms for adjusting the position of the wings are also within the scope of the invention. Similarly, several mechanisms, including without limitation bolts, pins, clamps and others are useful for securing the position of the wings in relation to the spine.

From the top view of FIG. 1*b,* it can be seen that in one preferred embodiment, the wings 120 and 130 are each made from two wing halves 123, 124 and 133, 134 which are snapped, glued or otherwise fastened, bonded or welded together. Preferably, the wings 120 and 130 are injection molded as fiber reinforced composite half shells, which may be similar to those disclosed in U.S. Pat. No. 5,464,240, and are later joined to form an assembled wing as shown in FIG. 1*b.* The half shell configuration yields a lightweight yet strong wing.

Figure 1E:
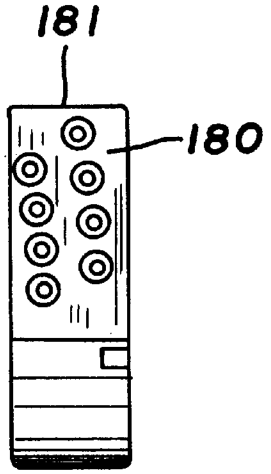
FIG. 1*e* depicts a partial side view of the subject matter of FIG. 1*c;*
Figure 1C:
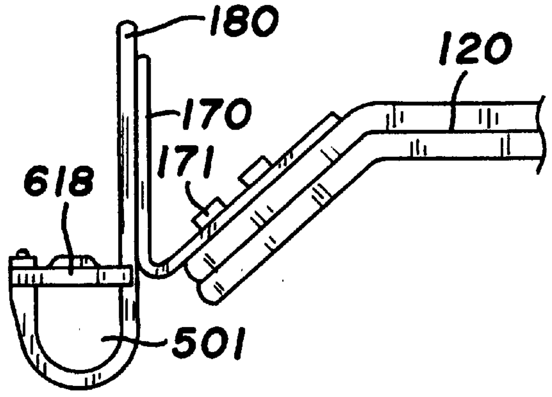
FIG. 1*c* depicts a top view of the left wing of the wheelchair seat back of FIG. 1*a,* illustrating a back wedge mounted to the left wing, a U-shaped back hook and a latch according to the invention.
Figure 1D:
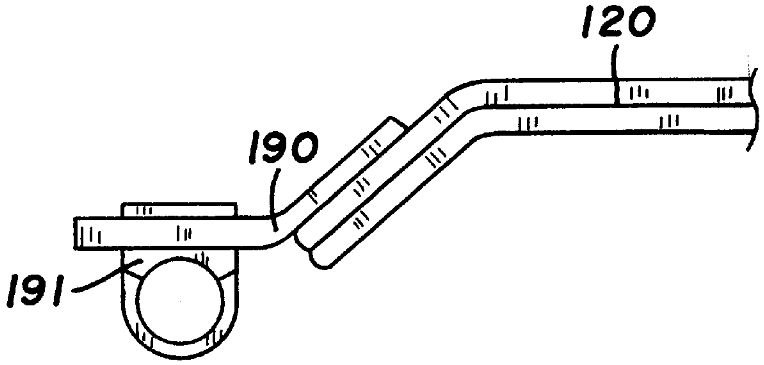
FIG. 1*d* depicts a top view of the left wing of the wheelchair seat back of FIG. 1*a,* depicting mounting of the rod which provides a lower point of rotation for installation of the wheelchair seat back and for forward and rearward adjustment of the wheelchair seat back.
Figure 1G:
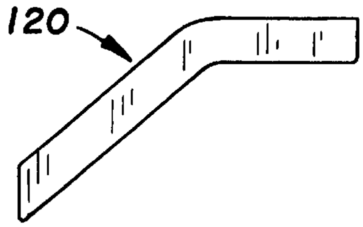
FIG. 1*g* depicts a top plan view of the wing shown in FIG. 1*f;*
Figure 1F:
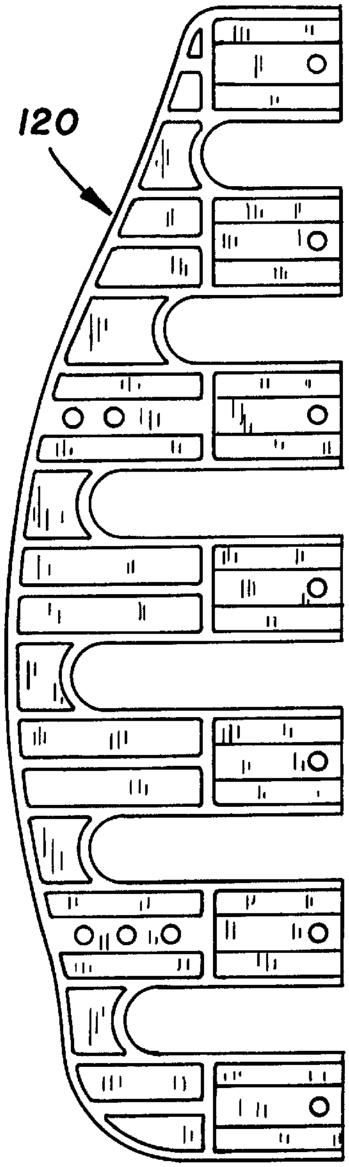
FIG. 1*f* depicts a front plan view of a second preferred embodiment of a right wing.

FIGS. 1*f* and 1*g* show a second, more preferred, embodiment of a right wheelchair seatback wing 120' according to the present invention (the corresponding left wing 130' of this embodiment is not shown). Each wing 120' may each be manufactured as a single piece from injection molded fiber reinforced plastic material, as described in detail below. Other materials which have some rigidity, including without limitation wood, plastic, fiberglass, rubber, metals such as stainless steel, aluminum, titanium, etc., and others, may also be used to manufacture wings 120 and 130.

Figure 2B:
FIG. 2*b* depicts a top view of the wheelchair seat back center piece or spine of FIG. 2*a;*
Figure 2A:
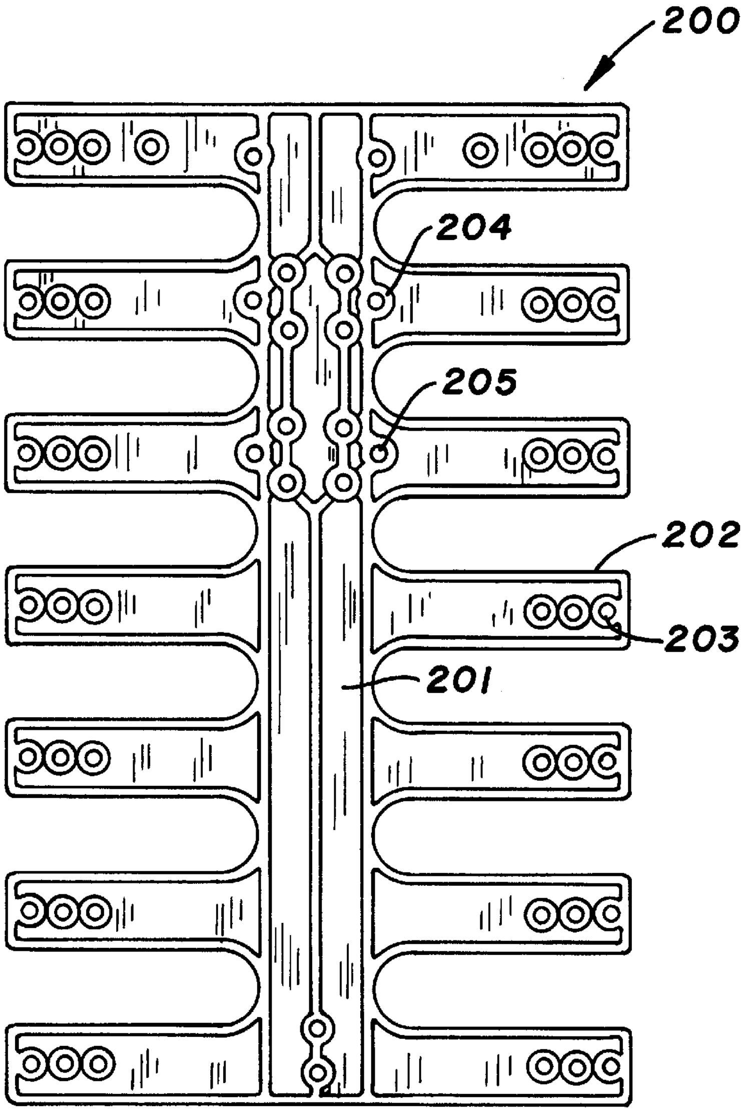
FIG. 2*a* depicts a front view of a wheelchair seat back center piece or spine of the invention.
Figure 2C:
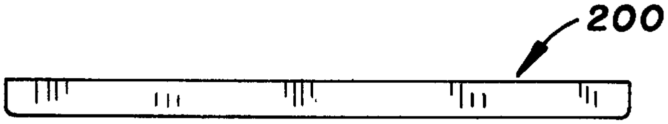
FIG. 2*c* shows a bottom view of the wheelchair seat back center piece or spine of FIG. 2*a;*

Referring to FIGS. 2*a,* 2*b* and 2*c,* front, top and bottom views, respectively, can be seen of the wheelchair seat back spine 200. The spine 200 has a vertically-oriented central member 201 from which emanate or protrude a plurality of ribs 202 extending both to the right and to the left of the central member. Each rib 202 has a plurality of attachment holes or bosses 203 to which width-adjustable wings may be mounted. Mounting holes or bosses 204 and 205 are also provided in two locations so that a headrest may be mounted to the spine 200 at either of two heights.

Figure 3B:
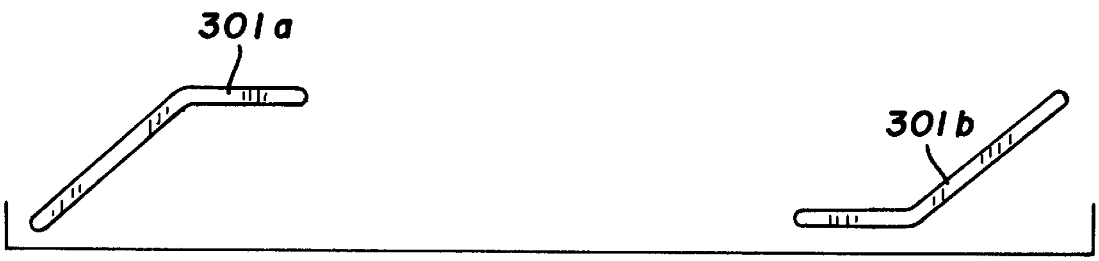
FIG. 3*b* depicts a top view of the two halves (unassembled) of a left wing of a wheelchair seat back spine of the invention.
Figure 3A:
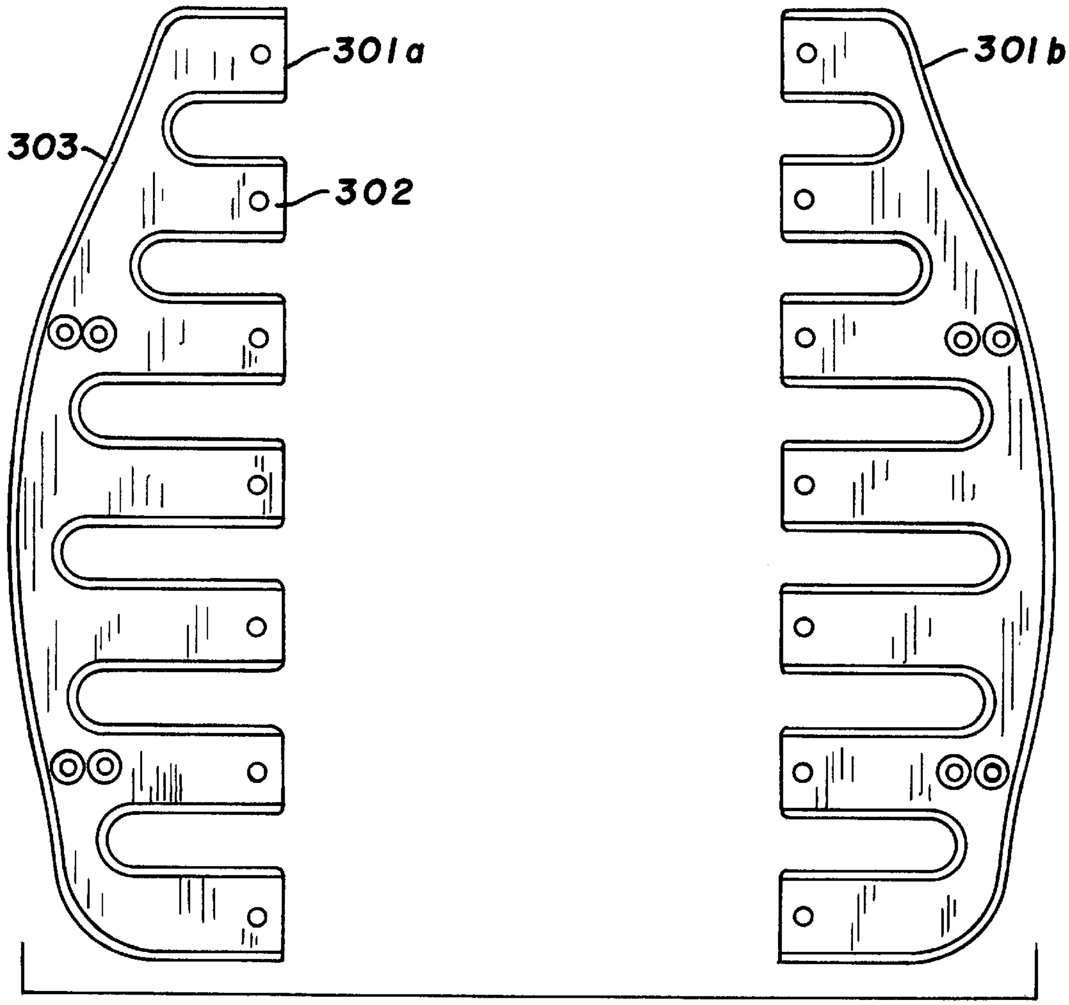
FIG. 3*a* depicts a front view of the two halves (unassembled) of a left wing of a wheelchair seat back spine of the invention.

Referring to FIG. 3*a,* two halves 301*a* and 301*b* of a left side wheelchair seat back wing are shown after molding and before assembly. The individual ribs 302 can be seen which emanate from an outer peripheral body 303. FIG. 3*b* depicts assembly of the two halves 301*a* and 301*b* to form an assembled width adjustable wing.

B. Angle Adjustable Mounting Brackets

In the preferred embodiment of the invention, an upper mounting assembly for the seat back includes a back wedge which is attached to one of the seat back wings, and a back hook, which is attached to the back wedge and which engages an elongate member of the wheelchair.

Figure 4B:
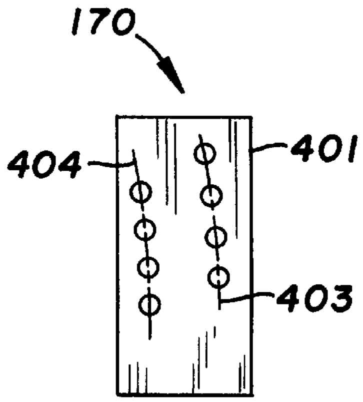
FIG. 4*b* depicts an inside side view of the back wedge of FIG. 4*a;*
Figure 4A:
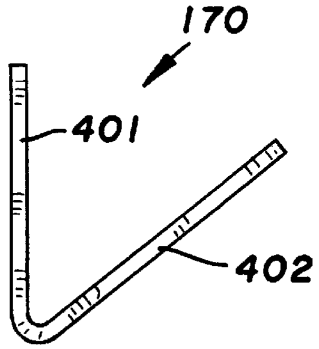
FIG. 4*a* depicts a top view of a back wedge of the invention.
Figure 4C:
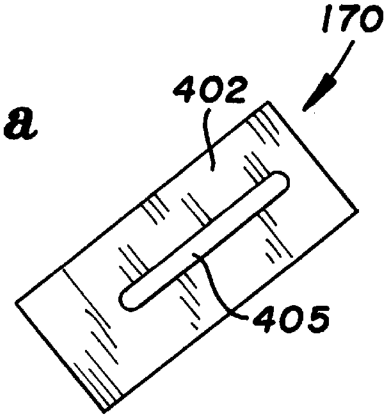
FIG. 4*c* depicts an outside side view of the back wedge of FIG. 4*a;*

Referring to FIGS. 1*c* and 1*e,* in the preferred embodiment of the seat back, mounting of a back wedge 170 and back hook 180 to a wing 120 can be seen. Preferably, the back wedge 170 is mounted to an upper portion of the wing 120, referred to as an upper mounting location. Referring to FIGS. 4*a,* 4*b,* 4*c* and 4*d,* the back wedge 170 preferably is configured in a V-shape and includes a first attachment section 402, which is designed to mount to the wheelchair seat back and a second attachment section 401, which is adapted to attach to a back hook (reference number 500 in FIGS. 5*a,* 5*b* and 5*c*).

Figure 4D:
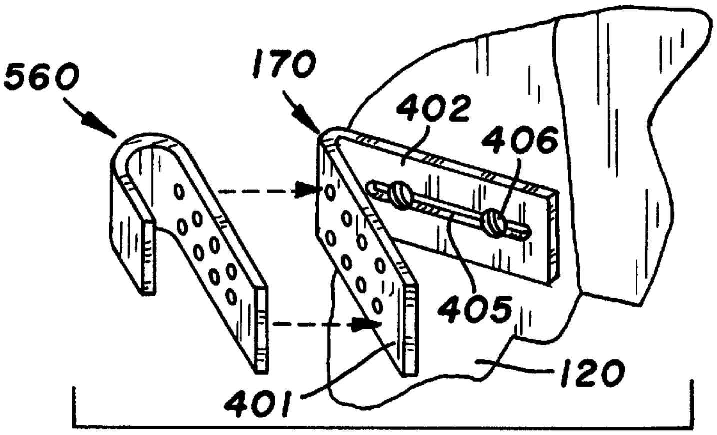
FIG. 4*d* is an exploded perspective view of the seat back of FIG. 1*a,* illustrating attachment of the back wedge of FIG. 4*a* thereto and the attachment of a preferred embodiment of a U-shaped back hook to the wedge.

With reference to FIG. 4*d,* a slot 405 is formed through attachment section 402. A fastener 406 placed through the slot 405 and at an appropriate position through a boss, hole, slot or the like (not shown) on the wing 120 to secure the back wedge 170 to the wing 120. Preferably, the slot 405 and the fastener 406 also permit the wedge 170 to be adjusted left and right with respect to the wing. The use of a slot or a plurality of holes or bosses on the back wedge 170 for mounting the back wedge to the wheelchair seat back facilitates placement of the fastener 406 in an appropriate position in the slot 405, holes or bosses to accommodate mounting of the seat back to wheelchair uprights of various widths. Fasteners 406 useful with the back wedge 170 of the invention include, without limitation, bolts, screws, rivets, pins, nails, and others.

Preferably, second attachment section 401 has two rows of mounting holes 403 and 404, which are positioned along arcs. In the preferred embodiment of the invention, the arcs of rows 403 and 404 are of two circles having radii $R_1$=7.525 inches and $R_2$=6.875 inches. The mounting holes are placed at 2 degree intervals on arcs of those circles. However, other radii are also within the scope of the invention. Similarly, arcs other than circular, including without limitation elliptical, ovoid, parabolic, and others, are also useful for the placement of mounting holes. Spacing of the mounting holes at angles other than two degrees is also within the scope of the invention. Similarly, the mounting holes need not all be spaced at the same distance from each other. Further, wedge 170 may be attached to a lower location or a central location at or near the side of the seat back.

The preferred back wedge is made from steel and the preferred back hook is made from injection molded fiber reinforced composite materials, as described in detail below, although they could be made from a variety of other materials, including wood, plastic, fiberglass, rubber, metals such as brass, copper, stainless steel, bronze, titanium, etc., and others. The back wedge may also be made from injection molded fiber reinforced composite materials, as described in detail below.

Figure 5A:
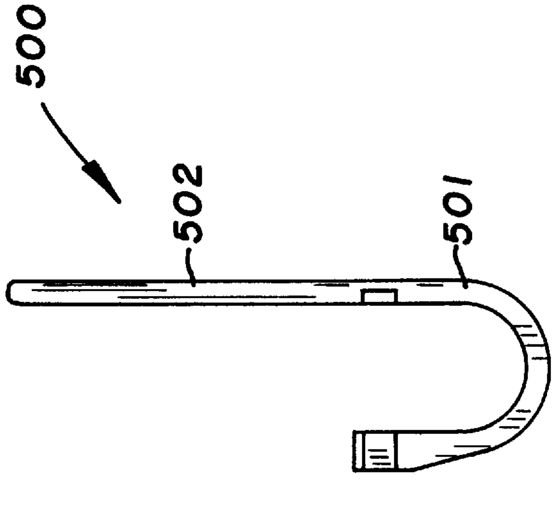
FIG. 5*a* depicts a top view of a U-shaped back hook of the invention.
Figure 5B:
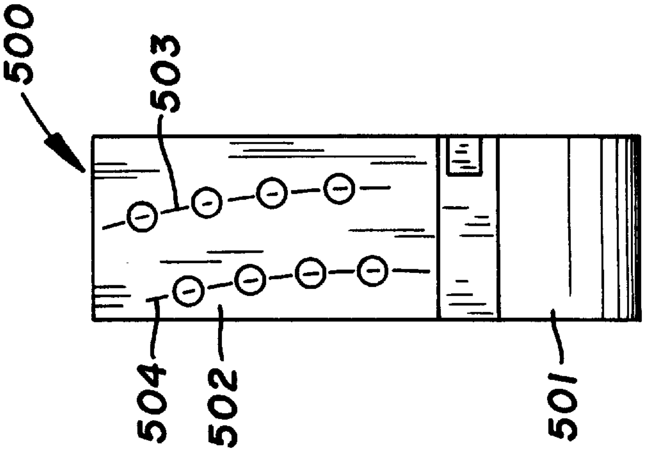
FIG. 5*b* depicts a side view of the back hook of FIG. 5*a;*
Figure 5C:
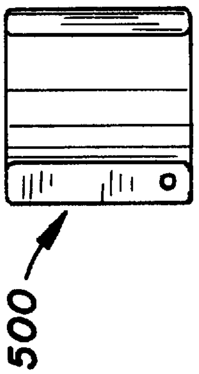
FIG. 5*c* depicts an end view of the back hook of FIG. 5*a;*

Referring now to FIGS. 5*a,* 5*b* and 5*c,* top, side and end views, respectively, of a U-shaped back hook 500 of a first wheelchair seat back mounting bracket of the preferred embodiment of the invention are shown. The back hook 500 includes an elongate extension referred to as the wheelchair seat back mounting and adjustment section 502. Preferably, back hook 500 also has a U-shaped extension, referred to as mounting hook 501, which is adapted to engage an elongate frame member of a first apparatus, such as a push handle of a wheelchair. Mounting and adjustment section 502 attaches to a second apparatus, such as a wheelchair seat back.

Preferably, seat back mounting section 502 is adjustable, and includes two rows of mounting and adjustment holes 503 and 504. Preferably, rows 503 and 504 correspond to the arcs of rows 403 and 404 of the second attachment section 401 of back wedge 170. Thus, in the preferred embodiment, the first, or upper, row 503 of mounting and adjustment holes are placed at 2 degree intervals on an arc of a circle having radius $R_1$=7.525 inches, and the second, or lower, row 504 of mounting holes are placed at 2 degree intervals on an arc of a circle having radius $R_2$=6.875 inches. Radii $R_1$ and $R_2$ are measured from the arc which passes through the centers of each of the mounting holes located on rows 503 and 504, respectively, to the point about which the wheelchair seat back will rotate when forward and backward adjustment is made to it. Preferably, the point of rotation is pivot pin (reference number 712 of FIG. 7*a*).

By utilizing the various mounting holes to adjust the back hook 500 with respect to the back wedge 170, a variety of forward and rearward seat back adjustment angles can be achieved. Preferably, the mounting holes of back hook 500 correspond to the mounting holes on the back wedge 400, for fastening thereto (i.e., one fastener, such as a bolt, screw, pin, rivet, or the like, is placed in each row of mounting holes for a total of two fasteners per back hook/back wedge combination). Thus, a plurality of adjustment positions are possible between the back hook and the back wedge in order to achieve a plurality of forward and backward tilt adjustment positions in the wheelchair seat back relative to the pivot pin. Preferably, each adjustment angle is a discrete position and the wheelchair seat back can be firmly mounted in each discrete position, as opposed to sliding in a slot if infinite adjustment were provided. The number of positions per row is equal to the number of mounting holes on a row 503 or 504 of back hook 500 multiplied by the number of mounting holes in the corresponding row 403 or 404 of back wedge 400.

Those of ordinary skill in the art will readily see that other radii, as well as arcs of a shape other than circular, including without limitation elliptical, ovoid, parabolic, and others, are also useful for the placement of mounting holes. Spacing of the mounting holes at angles other than two degrees is also within the scope of the invention. Similarly, the mounting holes need not all be spaced at the same distance from each other.

C. Quick Release Bracket

Figure 6A:
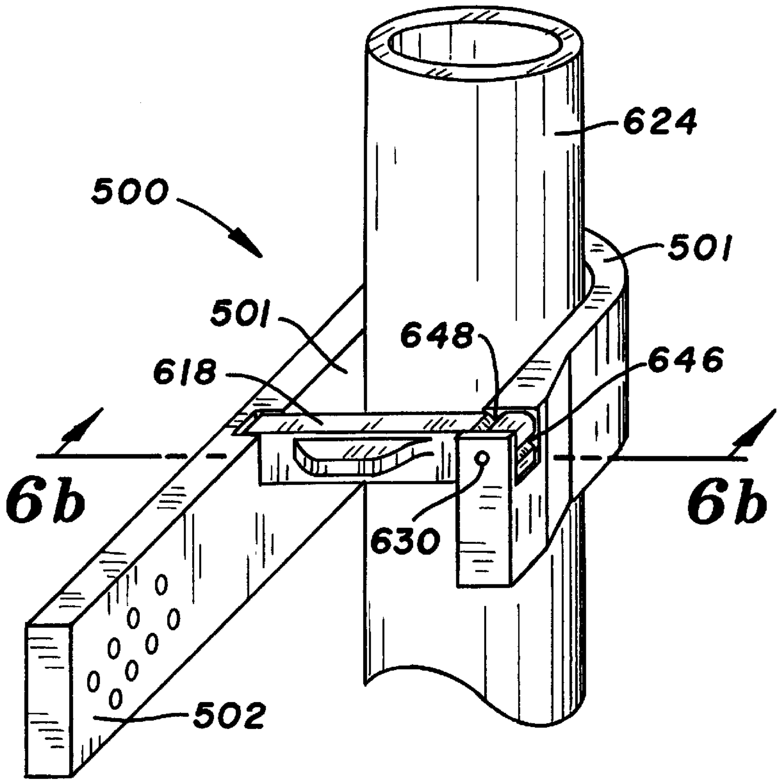
FIG. 6*a* depicts a frontal perspective view of a preferred embodiment of a latch bracket for use in the present invention.

The preferred back hook 500 also includes a second mounting portion, referred to as mounting hook 501, which is used to secure the back hook 500 to an elongate frame member such as one of the upright frame members of a wheelchair (e.g., a push handle). Referring now to FIG. 6*a,* the mounting hook 501 of the U-shaped back hook 500 according to a preferred embodiment of the present invention also includes a latch 618 hingedly attached to the bracket member, a detent pin (not shown) which secures the latch into a specific position, and a latch retention spring (not shown), which forces the retention pin against the latch.

Figure 6B:
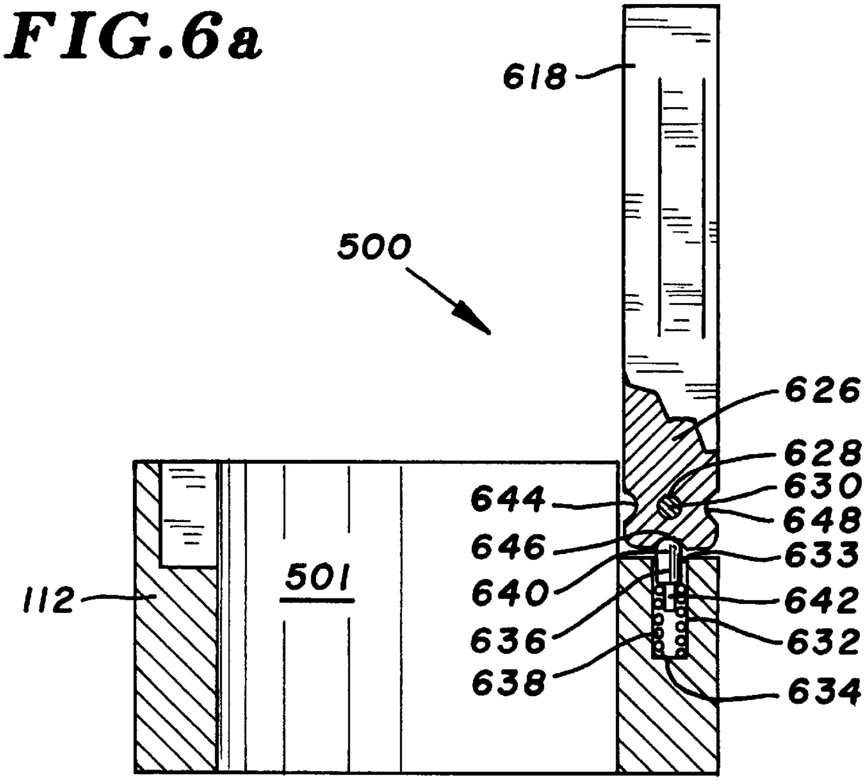
FIG. 6*b* depicts a cross-sectional view through line 6—6 of FIG. 6*a;*

Latch 618 has a closed position and an open position (shown in FIG. 6*b*). When latch 618 is in the closed position, it substantially encloses the opened portion of U-shaped mounting hook 501. Thus, when mounting hook 501 engages frame member 624 and latch 618 is placed in the closed position, movement of the seat back substantially transverse to the push handle is significantly restricted. As latch 618 is moved to the open position, mounting hook 501 of back hook 500 can be removed from frame member 624.

With reference to FIG. 6*b,* latch 618 includes a bracket attachment end 626 having hinge receptacle 628 formed therethrough. A hinge 630 attached to back hook 500 extends through hinge receptacle 628, hingedly attaching latch 618 to the bracket member.

In the preferred embodiment, back hook 500 includes a receptacle 632 for a hinge retention mechanism. Receptacle 632 has an open end 633 and an end 634 which is at least partially closed. The preferred configuration of hinge retention mechanism includes a detent pin 636 and latch retention spring 638, which are disposed within receptacle 632. Detent pin 636 includes a head 640 and a shaft 642. Head 640 is preferably convex in shape. Preferably, spring 638 is a coiled spring which, in its relaxed (i.e., non-compressed) state, is longer than shaft 642 and surrounds the shaft. Spring 638 preferably has a diameter smaller than the outer diameter of head 640. Thus, as spring 638 and detent pin 636 are inserted into receptacle 632, one end of the spring abuts the underside of head 640, while the other end of the spring abuts the closed portion of end 634 of the fastener receptacle. Thus, spring 638 forces detent pin 636 through open end 633 of the receptacle and head 640 against bracket attachment end 626 of latch 618.

Indents, which are referred to as positional securing notches 644, 646 and 648, are formed on bracket attachment end 626 of latch 618. As latch 618 is rotated around hinge 630, positional securing notches 644, 646 and 648 engage head 640 of detent pin 636. Considerable additional force must be applied to latch 618 to rotate the latch past a positional securing notch. In the present embodiment, when latch 618 is in the closed position, head 640 is engaged within notch 644.

As those of ordinary skill in the art will readily appreciate, other quick release mechanisms could be used to secure the latch in a closed position. For example, the latch could be a fastener such as a pin, which is secured across the back hook. Similarly, the latch could be completely removable from the back hook and slide or snap into place. Other embodiments of a readily releasable latch are also apparent.

The preferred quick release bracket latch is made from injection molded fiber reinforced composite materials, as described in detail below, although it could be made from a variety of other materials, including wood, plastic, fiberglass, rubber, metals such as brass, copper, stainless steel, bronze, titanium, etc., and others.

D. Pivotal Bracket Assembly

In order to further restrict movement of a component such as a wheelchair seat back along an elongate frame member such as a wheelchair push handle, the use of an accessory mechanism is often desired. In the present invention, the preferred lower bracket assembly serves this purpose. The preferred lower bracket assembly includes a tube bracket which engages a pivot pin.

Figure 7A:
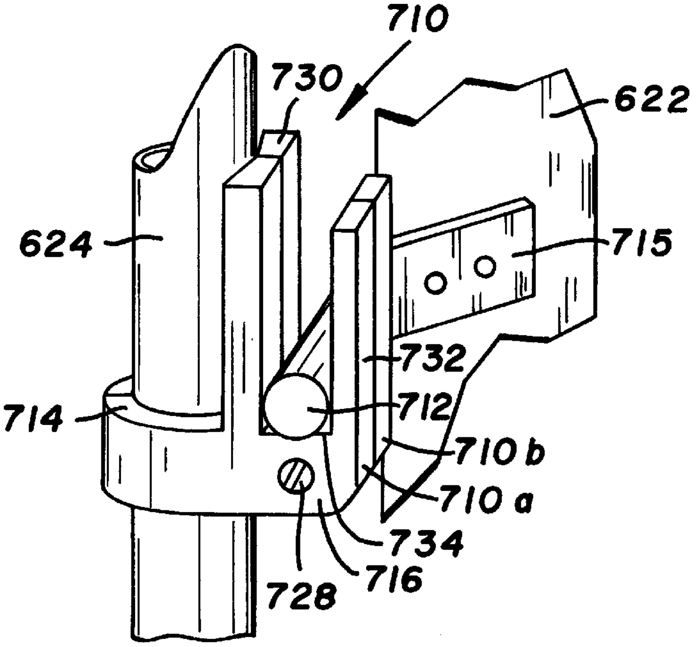
FIG. 7*a* depicts a side perspective view of a preferred embodiment of a tube bracket and a pivot pin of the invention.

Referring to FIG. 7*a,* tube bracket 710, also referred to as the upright mounting mechanism, restricts movement of component 622 along elongate member 624 in at least one direction. In wheelchairs, tube bracket 710 preferably restricts movement of component 622, such as a wheelchair seat back, downward in relation to push handle 624. Tube bracket 710 engages an extension from the component, referred to as pivot pin 712, to accomplish this task. More specifically, referring to FIG. 1*d,* which is a section of FIG. 1*a* at B—B, pivot pin 712 attaches the bottom of wing 120 to tube bracket 710. Tube bracket 710 attaches to the wheelchair upright.

A preferred embodiment of tube bracket 710 includes a frame engaging member 714 and a pivot pin holder 716 adjacent to the frame engagement member. Frame engagement member 714 is adapted to fit snugly around frame member 624, securing tube bracket 710 thereto.

Figure 7B:
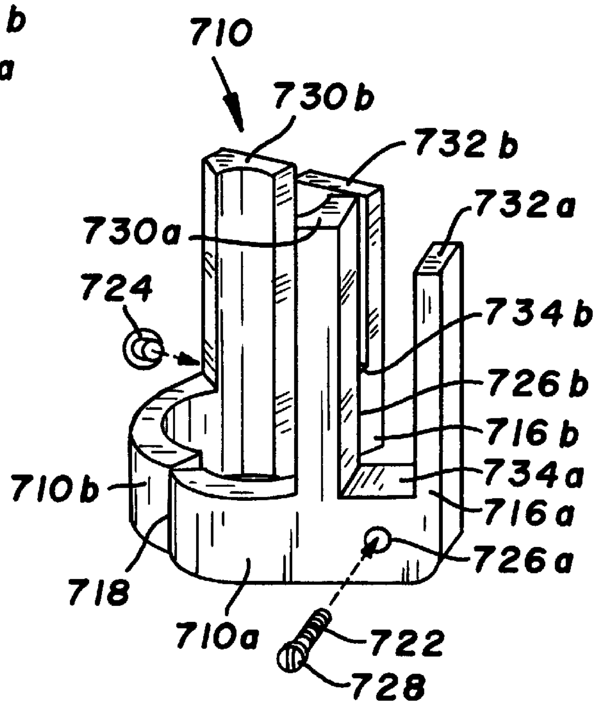
FIG. 7*b* depicts a perspective view of the tube bracket of FIG. 7*a,* showing the bracket in an open position.

With reference to FIG. 7*b,* tube bracket 710 preferably has two pieces 710*a* and 710*b* which are connected by a hinge 718 located between the two pieces of frame engaging member. Hinge 718 hingedly connects the two pieces of the frame engaging member. Thus, hinge 718 facilitates the attachment of tube bracket 710 to and its removal from the elongate member. A coupling mechanism located opposite hinge 718 secures pieces 710*a* and 710*b* from hinged movement relative to each other. The coupling mechanism preferably includes a threaded bolt 722, a nut 724 which is threaded complimentarily to the bolt, and a continuous elongate opening formed through each of pieces 710*a* and 710*b,* referred to as bolt retainers 726*a* and 726*b.* Nut 724 is preferably a threaded receptacle member such as a riv nut, a hex nut, or any other receptacle member that will engage bolt 722. However, as will be readily apparent to those of skill in the art, other fasteners may also be used to secure the tube bracket onto an elongate member. Preferably, nut 724 is attached to bolt retainer 726*b* and is continuous therewith. Bolt 722 has a head 728 at one end and threading at the other. The bolt head 728 abuts the outer surface of tube bracket piece 710*a* (best shown in FIG. 7*a*). In use, the threaded end of bolt 722 is inserted into retainer 726*a,* through retainer 726*b* and screwed into nut 724. As the threaded end of bolt 722 is screwed into nut 724, tube bracket piece 710*b* is forced toward piece 710*a.* Thus, upon tightening of bolt 722, tube bracket pieces 710*a* and 710*b* preferably abut opposite sides of elongate frame member 624, securing tube bracket 710 thereto.

Preferably, each piece of pivot pin holder 716*a* and 716*b* includes two parallel arms 730*a,* 732*a* and 730*b,* 732*b,* respectively, which extend upward therefrom. The distance between arms 730*a* and 732*a* and arms 730*b* and 732*b* is sufficient to allow a pivot pin to slide therebetween. Arms 730*a* and 732*a* are connected by stop 734*a.* Likewise, arms 730*b* and 732*b* are connected by stop 734*b.* As shown in FIG. 7*a,* a pivot pin 712 which has been inserted between arms 730 and 732 rests upon stop 734.

Figure 7C:
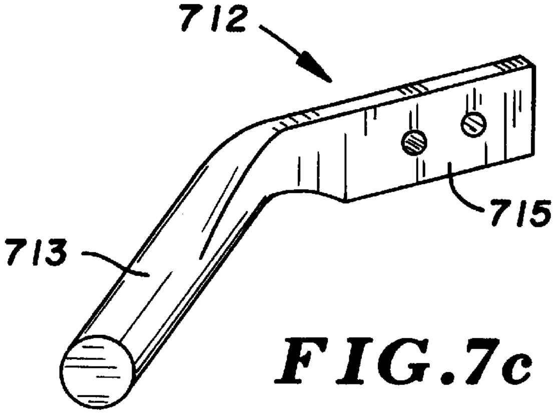
FIG. 7*c* depicts a perspective view of the pivot pin of FIG. 7*a;*

FIG. 7*c* shows a preferred embodiment of pivot pin 712, which includes a pivot end 713 and a component attachment end 715. Pivot end 713 is engaged by the pivot pin holder of the tube bracket. Component attachment end 715 attaches to a component (e.g., reference 622 of FIG. 7*a*). Preferably, component attachment end 715 attaches to a lower mounting location at or near the side of the seat back. However, as those in the art will readily see, the pivot pin may be attached to other locations on the seat back.

Other mechanisms which allow pivotal attachment of a seat back to a wheelchair, including without limitation the use of hinges, alternative configurations of the tube bracket and pivot pin, and others, will be readily apparent to those of skill in the art and, therefore, are also within the scope of the present invention.

Referring again to FIG. 7*a,* a preferred method of use includes attachment of tube bracket 710 to frame member 624, connection of component 622 to the tube bracket by insertion of pivot pin 712 into pivot pin holder 716, and attachment of the latch bracket to frame member 624. Attachment of tube bracket 710 to frame member 624 comprises opening of pieces 710*a* and 710*b* relative to hinge 718, placement of frame member 624 into frame engaging member 714, closing of the bracket pieces around the frame member, insertion of bolt 722 into the bolt retainers, and tightening of the bolt into the nut.

Component 622 is attached to bracket 710 by inserting pivot pin 712 between arms 730 and 732 (730*a,* 730*b* and 732*a,* 732*b*) and pushing the pivot pin against stop 734 (734*a,* 734*b*). Back hook 500 is then positioned proximately to frame member 624 by pivotal movement of component 622 around the pivot pin 712—pivot pin holder 716 assembly.

Next, referring again to FIGS. 6*a* and 6*b,* latch 618 is placed in the open position and securing arm 614 is positioned against frame member 624, engaging the frame member. Latch 618 is then placed in the closed position to secure frame member 624 within mounting hook 501 (best shown by FIG. 6*a*).

As those in the art will readily understand, other mechanisms which attach the seat back to the back wedge are also within the scope of the present invention. Such mechanisms include, without limitation, hooks which secure directly to the wings or the spine to engage the upright push handles of a wheelchair, extensions of wings which engage wheelchair push handles, wings which engage wheelchair push handles, and others.

E. Adjustable Seat Back Cover

Figure 8A:
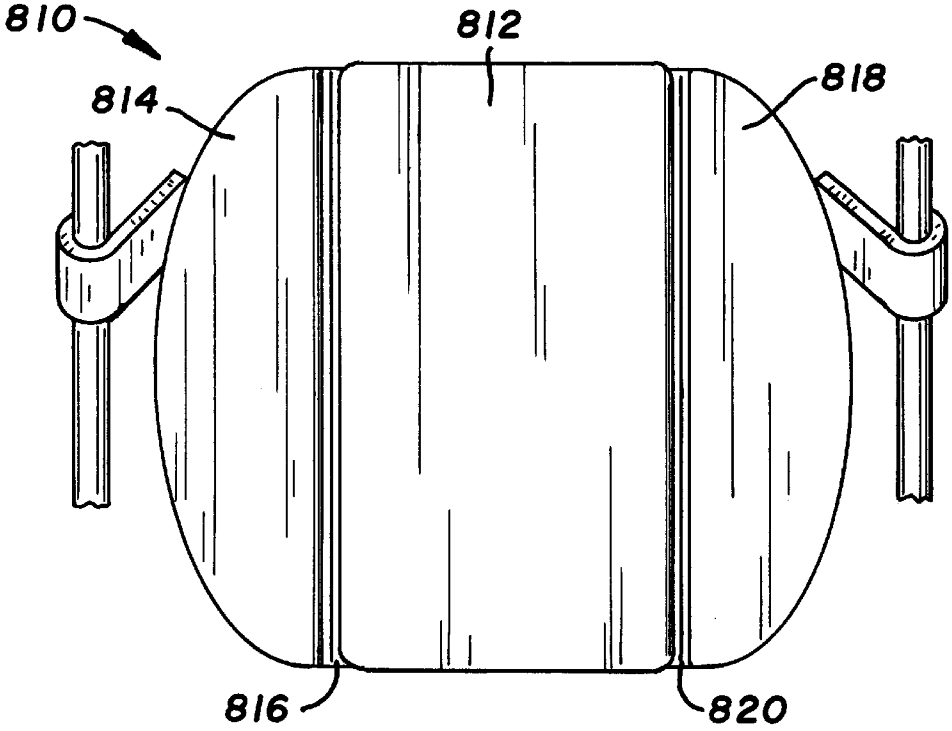
FIG. 8*a* depicts a frontal perspective view of a preferred embodiment of the wheelchair seat back cushion of the present invention.

FIG. 8*a* depicts a preferred embodiment of wheelchair seat back cushion 810 for use on the adjustable wheelchair seat back 800 (not shown) of the present invention. Seat back cushion 810 includes spine cushion 812, wing cushions 814 and 818, and wing cushion extenders 816 and 820.

Figure 8B:
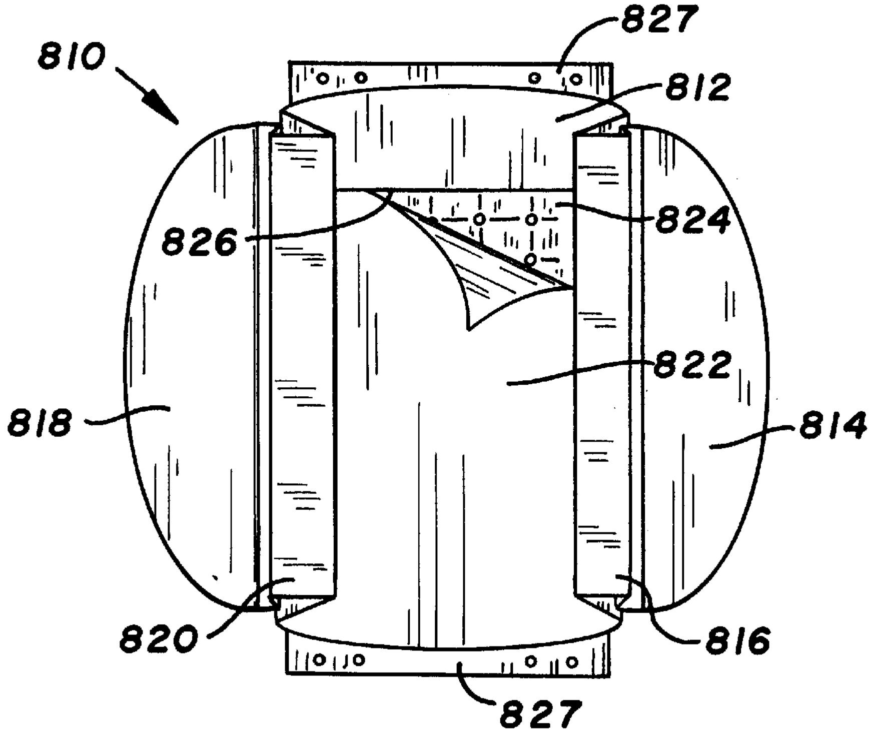
FIG. 8*b* depicts a rear perspective view of the seat back cushion of FIG. 8*a,* with the pouch of the spine cushion partially detached to show the pad.

As shown in FIG. 8*b,* spine cushion 812, also referred to as center cushion, has a pad 824 and a pouch 822 positioned behind the pad. Preferably, spine cushion 812 also includes an access mechanism 826 which facilitates insertion of shaped accessory padding (not shown) into or its removal from pouch 822. Spine cushion 812 may also have a seat back attachment mechanism 827. The shaped accessory padding is useful for altering the shape of the cushioning surface to adjust pressure points of the wheelchair seat back cushion against a wheelchair user's back.

Spine cushion 812 is preferably sewn into a cover 813 made from a flexible, smooth fabric such as the stretchable fabrics sold as LYCRA® and PENNYLA®. Pouch 822 is preferably made from a durable fabric such as that commonly sold under the trademark CORDURA® by DuPont, which is generically referred to as heavy duty woven nylon fabric. However, any durable material which is suitable for covering cushions is useful in the present device. Pouch 822 preferably has approximately the same dimensions as spine 810 (not shown). Thus, accessory padding may be placed within pouch 822 at any position over the entire surface of the spine. Preferably, the inner surfaces of pouch 822 have corresponding strips of hook and loop fasteners attached thereto (not shown)(i.e., a strip on the inner front surface of pouch attaches to a corresponding strip on the inner back surface of pouch). As a shaped accessory pad is inserted into pouch 822, the hook or loop fasteners located at the sides, top and bottom attach to their corresponding loop or hook fastener to hold the accessory pad into place within the pouch.

Preferably, pad 824 includes a lightweight flowable cushioning medium, such as that disclosed in U.S. Pat. Nos. 5,421,874, 5,503,773 and 5,626,657 and in U.S. patent application Ser. No. 08/692,635, which are each hereby incorporated by reference in their entirety. However, any device which provides a cushioning effect is useful as a pad in the present invention. Preferably, the lightweight flowable cushioning medium used in pad 824 includes a lubricous mixture comprising about 99.3 weight percent white mineral oil USP grade sold under the trade name of SUPERLA White Mineral Oil No. 21 by Amoco Corporation of Chicago, Ill.; about 0.7 weight percent of either KRATON® G 1651 manufactured by Shell Chemical Company of Houston, Tex. (polystyrene-poly(ethylene/butylene)-polystyrene block copolymer) or SEPTON® 8006 manufactured by Kuraray Co., Ltd., Isoprene Chemicals Division, of Tokyo, Japan (polystyrene-polybutadiene-polystyrene); and less than about 0.1 weight percent IRGANOX® 1010 antioxidant manufactured by Ciba-Geigy Corporation of Tarrytown, N.Y. The lightweight flowable cushioning medium further comprises acrylic microscopic spherical objects (acrylic microspheres) such as those marketed under the trade name PM6545 by the PQ Corporation of Duluth, Ga. Preferably, the acrylic microspheres are combined with the lubricous mixture to form a composite mixture having a specific gravity of about 0.36 to about 0.06 or less. The spherical objects are acrylic plastic-walled microspheres in the 10–200 micron diameter range and having a uniform wall thickness and a spherical configuration. These microspheres have a specific gravity of about 0.02, and an elastic characteristic, such that the microspheres can be compressed to less than 20% of their original volume and rebound to about 100% of their original volume when the compressive force is removed. These microspheres are also resistant to a pressure of about 2,000 psi without rupturing.

The most preferred pad 824 of the present invention is a puff-quilted bladder containing a lightweight flowable cushioning medium, such as that disclosed in U.S. patent application Ser. No. 08/724,764, which is hereby incorporated by reference. This type of cushion is very light weight and readily deformable, yet holds the cushioning medium substantially in place.

Other types of cushioning materials useful as pad 824 in the present invention include, but are not limited to, multi-celled cushions formed from separate reshapable cells, such as those disclosed in U.S. Pat. No. 5,592,706 and U.S. patent application Ser. No. 08/783,378, both of which are hereby incorporated by reference, a single bladder containing one of the flowable cushioning mediums described above or any other flowable cushioning medium, foam cushions, and gel-containing cushions, and others.

A goal of cushions containing flowable cushioning medium is for the skin of the bladder containing the flowable cushioning medium to be loose enough to deform to the cushioned object's shape, but then, as the object continues to sink in (i.e. as the bladder conforms to the cushioned object's shape), to become tight-skinned (causing the object to "hammock" before hitting the base). This goal is achieved when a base smaller in dimension than the bladder is used.

When the preferred cushioning media are used in the cover, the preferred fluid fill level of the bladder, prior to sewing to the base, is 30% to 40% of the bladder's volumetric capacity. However, any fill level less than 100% is intended to be encompassed within the inventive concept. The fulfillment of the cushioning goal in the previous paragraph is obtained by balancing the degree of loose skin on the bladder with the fill level of the bladder, so many combinations are possible. Too much hammocking inhibits proper cushioning. Hammocking also occurs when a cushion cover fits too tightly over the cushion.

With reference to FIG. 8*b*, in a preferred embodiment of the wheelchair seat back cushion, access mechanism 826 is formed by overlapping the edges of the pouch material. Preferably, the overlapped layers are removably attached to one another. A preferred mechanism, such as a hook and loop fastener (commonly referred under the trademark VELCRO®) or a zipper, provides quick access between and easily separates the two layers. Other mechanisms, including without limitation buttons, snaps, and others are also useful for removably attaching the access mechanism layers.

A preferred embodiment of attachment mechanism 827 includes a combination of corresponding snaps and corresponding hook and loop fasteners (marketed under the trademark VELCRO®) on spine 810 (not shown) and spine cushion 812. Other embodiments of attachment mechanism 827, including but not limited to the sole use of snaps, sole use of hook and loop fasteners, hooks, pockets which are formed to fit over a portion of the spine, and others are readily apparent.

Figure 8C:
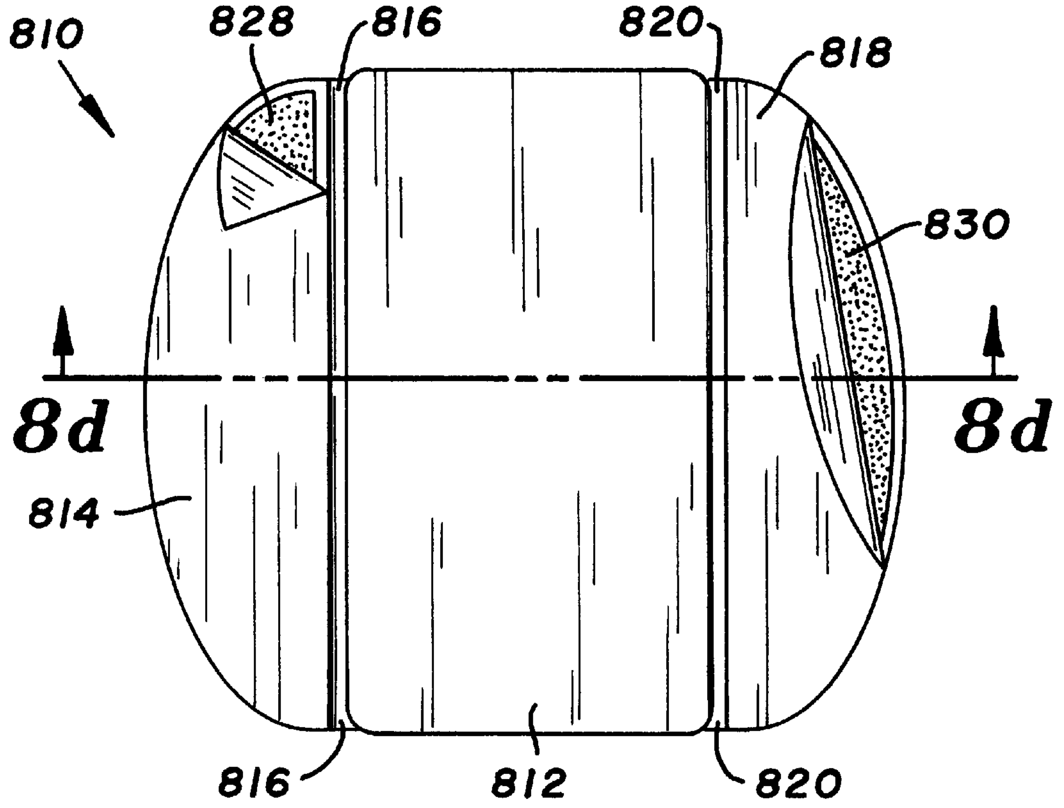
FIG. 8*c* depicts a frontal perspective view of the seat back cushion of FIG. 8*a,* with the cover of each wing cushion partially detached to show the cushioning pads.
Figure 8D:
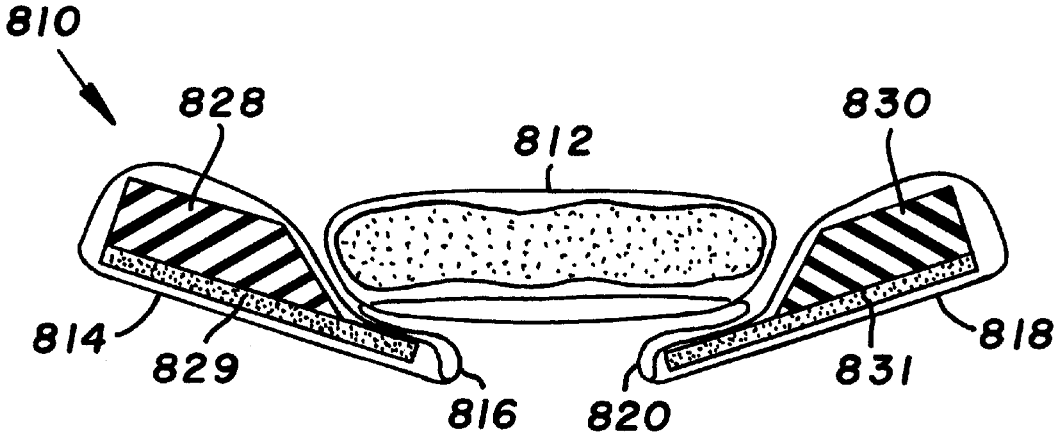
FIG. 8*d* depicts a cross section taken through line 8*d*—8*d* of FIG. 8*c*.

Referring now to FIGS. 8*c* and 8*d*, wing cushions 814 and 818 each enclose a cushioning pad 828 and 830, respectively. A wing attachment mechanism may also be formed on the back of each of wing cushion 814 and 818. Wing cushions 814 and 818 may also include a pad removal mechanism.

The front surfaces of each of wing cushions 814 and 818 is preferably made from flexible, smooth fabric such as the stretchable fabrics sold as LYCRA® and PENNYLA®. The back surface of each of wing cushions 814 and 818 is preferably made from durable, pliable fabric such as the heavy duty woven nylon fabric marketed under the trademark CORDURA®. However, any durable material which is suitable for covering cushions is useful in the present device.

Wing attachment mechanisms 832 and 834 are each preferably a pocket or combination of pockets adapted to engage the wings. Several alternate embodiments or variations of the wing attachment mechanism, including but not limited to snaps, straps, flaps or the like which attach to the seat back wings or otherwise engage the wings, hook and loop fasteners (marketed under the trademark VELCRO®) and hooks, may be made by persons of ordinary skill in exercising design choice.

Preferably, cushioning pads 828 and 830 are manufactured from a reformable cushioning medium such as open cell polyurethane foam. Other materials which provide either a reformable or a deformable cushioning effect are also useful in the wing cushions of the present invention. In a preferred embodiment, cushioning pads 828 and 830 further include a firmer thin foam member 829 and 831, respectively, laminated to the back thereof. Preferably, foam members 829 and 831 fill cushions 814 and 818, respectively, to hold pads 828 and 830 securely into place within wing cushions 814 and 818. A preferred material for making foam members 829 and 831 is a closed cell polyethylene foam, such as that marketed in other products by Otto Bock U.S., Inc. under the trade name BOCKLITE™.

Referring to FIG. 8*a,* extenders 816 and 820 are flat members which connect spine cushion 812 to wing cushions 814 and 818, respectively. Extenders 816 and 820 adapt cushion 810 to the various lateral positions of the wings. Thus, extenders 816 and 820 are fully extended as the wings are placed in their respective outermost positions. Extenders 816 and 820 fold behind spine cushion 812 when the wings are positioned closer to the spine. Therefore, cushion 810 fits the wheelchair seat back regardless of the position of the wings.

Preferably, extenders 816 and 820 are made of a durable, pliable, foldable fabric such as light weight nylon fabric. However, any other materials which provide similar utility are also useful. For example, stretchable fabrics such as LYCRA® and others may also be used to make extenders 816 and 820. When stretchable fabrics are used, the length of extenders 816 and 820 may be reduced since the stretchability and reboundability of the fabric will provide a portion of the required adjustability.

Referring again to FIG. 8*d,* as an example of the use of cushion 810 on a wheelchair seatback (not shown), wing attachment mechanisms engage the respective wings of a wheelchair seat back. Extenders 816 and 820 are tucked behind the spine cushion 812. Cushion 810 is then fastened to the wheelchair seatback.

As mentioned above, it is preferred that various components of the invention be injection molded. Injection molding reduces the cost of fabricating a fiber reinforced thermoplastic wheelchair component compared to conventional methods of producing fiber reinforced plastic products. In the preferred embodiment, the material used is thermoplastic (as opposed to thermoset plastic) filled with reinforcing fibers. Isoplast 101 LGF 40 available from the Dow Chemical Company of Midland, Mich. is preferred. This is 60% Isoplast 101 thermoplastic resin and 40% fiberglass fiber pre-formed into cylindrical pellets which are ready to injection mold. Many materials suitable injection molding are known in the art. In alternative injection-molded embodiments of the invention, other materials could be used for manufacture of products embodying the invention. Thermoplastic without reinforcing fibers, injectable metals, injectable quick-setting fiber-reinforced thermoset plastics, or any other injectable, quickly solidifying structural material could be used in other embodiments of the invention, such as NYLON 6 and NYLON 6-6 (polyamides) available from DuPont, PPS (polyphenelyne sulfide), high density polyethylene and polypropylene. Graphite (carbon) fiber commonly available commercially can be used as the reinforcing fiber, and standard modulus moderate strength TORAY T-700 graphite and NYLON 6-6 thermoplastic can be used. An equally suitable standard modulus standard strength fiber which could be used is HERCULES AS-4. Alternatively, intermediate modulus high strength graphite fibers such as TORAY M 30 and HERCULES IM-7 may be used. Aramid fibers such as KEVLAR 49 and TWARON as well as glass fibers such as E-glass and S2 glass available from Dow-Corning may be used. PPS (polyphenaline sulfide), PET (polyester terephthalate), ABS (acrylonitrile butadiene styrene), polycarbonate, or other structural thermoplastics could be used to make products embodying the inventive concept.

Molding of the invented components, when the preferred method of injection molding is used, takes place with standard industry-available molding machines with molds of appropriate shape that are known to persons of ordinary skill in the art.

While the present invention has been described and illustrated in conjunction with a number of specific embodiments, those skilled in the art will appreciate that variations and modifications may be made without departing from the principles of the invention as herein illustrated, described and claimed.

The present invention may be embodied in other specific forms without departing from its spirit or essential characteristics. The described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A wheelchair seat back assembly comprising:

a wheelchair seat back having an upper mounting location and a lower mounting location, a back wedge having a slot located in it and being attachable to said wheelchair seat back at said upper mounting location, said back wedge being laterally adjustable with respect to said seat back by sliding on said slot, a mounting bracket having a mount for mounting to a wheelchair upright and having a seat back mounting section, the seat back mounting section being adapted to attach to said back wedge, said mounting bracket being arcutately adjustable with respect to said back wedge, a lower bracket attachable to said wheelchair seat back at said lower mounting location, said lower bracket defining a pivot point for pivotal movement of said seat back;

wherein the angle of said seat back relative to a wheelchair is defined by said pivotal movement of said wheelchair seat back relative to said pivot point and said arcuate adjustment of said back mounting bracket relative to said back wedge; and wherein said back wedge is generally V-shaped.

2. A wheelchair seat back assembly as recited in claim 1, wherein said wheelchair seat back is positionable to a plurality of discrete angles from the vertical.

3. A wheelchair seat back assembly as recited in claim 1, wherein said back wedge slot permits a fastener to be installed through it to the wheelchair seat back and wherein the location of said back wedge with respect to the wheelchair seat back can be adjusted by moving said mounting bracket so that said fastener slides within said slot in order to adjust said mounting bracket laterally to accommodate wheelchair uprights spaced at various widths.

4. A wheelchair seat back assembly as recited in claim 1, wherein said lower bracket further comprises:

a pivot pin mounted to said lower mounting location of said wheelchair seat back to provide a pivot point for vertical angular adjustment of said wheelchair seat back; and an upright mount having a pivot pin engaging extension and an upright mounting mechanism;

wherein said upright mounting mechanism fixedly engages an upright of a wheelchair;

wherein said pivot pin engaging extension removably engages said pivot pin and allows said pivot pin to rotate therein; and wherein said pivot pin engaging extension retains said pivot pin from downward movement along the upright.

5. A wheelchair seat back assembly as recited in claim 1, wherein said upright mount further comprises two halves hingedly connected to one another and a fastener for fastening said halves to each other.

6. A wheelchair seat back assembly comprising:

a wheelchair seat back having an upper mounting location and a lower mounting location, an upper bracket assembly attachable to said upper mounting location, said upper bracket assembly defining an angle of said seat back relative to a wheelchair, and a lower bracket attachable to said lower mounting location, a back wedge having a slot located on it and being attachable to the wheelchair seat back, said back wedge being laterally adjustable with respect to the seat back by sliding on said slot, and a mounting bracket having a mount for mounting to a wheelchair upright and having a seat back mounting section, said seat back mounting section being adapted to attach to said back wedge;

wherein said lower bracket defines a pivot point which facilitates angular adjustment of said seat back in relation to a wheelchair to which the seat back is attached; and wherein said upper bracket defines the angle at which the seat back is attached to the wheelchair.

7. A wheelchair seat back assembly as recited in claim 6, wherein said upper bracket adjusts to change the angle of said seat back in relation to the wheelchair.

8. A wheelchair seat back assembly as recited in claim 6, wherein said seat back is positionable to a plurality of discrete angles from the vertical.

9. A wheelchair seat back assembly as recited in claim 6, wherein said upper bracket assembly is laterally adjustable with respect to the seat back.

10. A wheelchair seat back assembly as recited in claim 6, wherein said upper bracket assembly is arcuately adjustable.

11. A wheelchair seat back assembly as recited in claim 6, wherein said back wedge slot permits a fastener to be installed through it to the wheelchair seat back, and wherein the location of said back wedge with respect to the wheelchair seat back can be adjusted by moving said first mounting bracket so that said fastener slides within said slot in order to adjust mounting width to accommodate wheelchair uprights spaced at various widths.

* * * * *